United States Patent
Glembocki et al.

(10) Patent No.: US 8,235,537 B2
(45) Date of Patent: Aug. 7, 2012

(54) PLASMONIC RETROREFLECTORS

(75) Inventors: Orest J Glembocki, Alexandria, VA (US); Francis J Kub, Arnold, MD (US); Sharka M Prokes, Columbia, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 357 days.

(21) Appl. No.: 12/199,824

(22) Filed: Aug. 28, 2008

(65) Prior Publication Data
US 2009/0059371 A1 Mar. 5, 2009

Related U.S. Application Data

(60) Provisional application No. 60/969,198, filed on Aug. 31, 2007.

(51) Int. Cl.
*G02B 5/122* (2006.01)
(52) U.S. Cl. ....................................... 359/529
(58) Field of Classification Search ............ 359/529, 359/530
See application file for complete search history.

(56) References Cited

U.S. PATENT DOCUMENTS

| | | | |
|---|---|---|---|
| 3,946,130 A | 3/1976 | Tung et al. | |
| 4,192,576 A | 3/1980 | Tung et al. | |
| 6,350,034 B1 * | 2/2002 | Fleming et al. | 359/529 |
| 6,721,083 B2 | 4/2004 | Jacobson et al. | |
| 7,362,431 B2 | 4/2008 | Leona | |
| 2005/0018194 A1 | 1/2005 | Thirstrup et al. | |
| 2005/0172852 A1 * | 8/2005 | Anderson et al. | 106/31.03 |
| 2005/0185279 A1 * | 8/2005 | Mullen et al. | 359/530 |
| 2006/0088946 A1 | 4/2006 | Willson et al. | |

FOREIGN PATENT DOCUMENTS
WO 2008/019161 2/2008

OTHER PUBLICATIONS

Bao et al., "Study of silver films over silica beads as a surface-enhanced Raman scattering (SERS) substrate for detection of benzoic acid" J. Raman Spectroscopy, 34, 394-398 (2003).
Cai et al., "Highly efficient optical power transfer to whispering-gallery modes by use of a symmetrical dual-coupling configuration" Opt. Lett., 25(4), 260-262 (2000).
Jorgenson, "A surface plasmon resonance side active retro-reflecting sensor" Sensors and Actuators B, 73, 236-248 (2001).
Jun et al., "Surface-Enhanced Raman Spectroscopic-Encoded Beads for Multiplex Immunoassay" J. Comb. Chem., 9, 237-244 (2007).
Kim et al., "Facile Method to Prepare Surface-Enhanced-Raman-Scattering-Active Ag Nanostructures on Silica Spheres" Langmuir, 22, 8083-8088 (2006).
Lendle et al., "Flow Analysis-Based Surface-Enhanced Raman Spectroscopy Employing Exchangeable Microbeads as SERS-Active Surfaces" Appl. Spectroscopy, 54(7), 1012-1018 (2000).
Kneipp et al., "Single Molecule Detection Using Surface-Enhanced Raman Scattering (SERS)" Phys. Rev. Let., 78 (9), 1667-1670 (1997).
Prokes et al., U.S. Appl. No. 60/924,516 (filed May 18, 2007).
Prokes et al., U.S. Appl. No. 12/1078,888 (filed Apr. 8, 2008).
Yao et al., "Surface enhanced Raman scattering from transition metal nano-wire array and the theoretical consideration" Surface Science, 514, 108-116 (2002).
PCT Search Report and Written Opinion in PCT/US2008/081941, Mar. 9, 2009.

* cited by examiner

*Primary Examiner* — Euncha Cherry
(74) *Attorney, Agent, or Firm* — Amy L. Ressing; Joseph T. Grunkemeyer

(57) ABSTRACT

An article having: a retroreflective optical element and a plasmonic material on the optical element. A method of: performing an optical measurement on a substrate having a plurality of the articles.

24 Claims, 6 Drawing Sheets a) Metal nanosphere or nanoshell coated retroreflector bead b) Metal nanowires coated Retroreflector bead c) Metal coated retroreflector bead

Ag/silica core shell coating 500 nm diameter Ag shells

PLASMONIC RETROREFLECTORS

This application claims the benefit of U.S. Provisional Patent Application No. 60/969,198, filed on Aug. 31, 2007. This application and all other publications and patent documents referred to throughout this application are incorporated herein by reference.

FIELD OF THE INVENTION

The invention is generally related to surface enhanced Raman scattering and fluorescence active substrates.

DESCRIPTION OF RELATED ART

Raman scattering is often used in the chemical identification of materials. Light scattered from various vibrational modes in a material is red-and blue-shifted by the frequency of the vibrational modes. The experimental technique then detects the frequency-shifted light. The information that is obtained from Raman scattering is complementary to that of IR spectroscopy, but with the advantage of being performed with visible light. Because the Raman cross-sections of most materials are very small, the intensity of the Raman signal is often 8 orders of magnitude lower than the intensity of the exciting laser. Thus, rapid acquisition of Raman scattering requires the use of intense laser light, limiting the equipment to table top lasers. The situation is even more difficult for small amounts of a species adsorbed on a surface of a material.

In the surface enhanced Raman scattering (SERS) effect rough metal surfaces (usually Ag or Au) are used to increase the Raman signal of species adsorbed on the metal. Enhancements of up to 8 orders of magnitude have been observed. The SERS enhancement of molecules adsorbed on the roughened metal surface is caused by local electromagnetic fields that are created by the laser excitation of surface plasmons at the metal surface. It has also been shown that local hot spots in the electric fields produced by localized plasmons excited in nanoparticles can produce large SERS effects (Kneipp et al., Phys. Rev. Lett., 78, 1667 (1997)). This enhancement is often referred to as plasmonic and a substrate that exhibits electric field enhancements due to plasmons is called plasmonic substrate.

Furthermore, it has been suggested that using nanoparticles of appropriate size and geometry can lead to further enhancements by moving the plasmons absorption frequency close to that of the exciting laser (Yao et al., Surf. Sci., 514, 108 (2002)). This adds resonant enhancement to the SERS process, further increasing the Raman signal.

In addition to Raman scattering, molecular fluorescence can be enhanced by the adsorption of molecules on metal nanostructures. As in SERS, surface enhanced fluorescence (SEF) also relies on the electric fields to increase the signal strengths. Use of a laser frequency within the surface plasmon absorption band would produce enhanced fluorescence. The intersections of wires produce coupled plasmon resonances whose strength and width is significantly greater than that of the individual wires. This in turn leads to enhanced fluorescence.

To date the standard SERS or SEF substrates consisted of a metal nanoparticle coating on a flat substrate, usually glass, or some suitable semiconductor or metal. The SERS or SEF measurements involve an exciting laser to produce the sensing action and a detector system to detect it. The flat substrates lead a single pass measurement, in which the light excites SERS just once. An alternative approach has been to use a total reflection prism and to make the surface SERS or SEF active. In this case, the exciting light makes multiple passes enhancing the SERS or SEF signal. The drawback to this approach is that the substrate configuration has to be specifically designed for the wavelength of the exciting laser and furthermore, the coupling with the total internal reflection prism must occur at a specific angle of laser light incidence. Thus a precision optical tool is required to take full advantage of this additional enhancement.

SUMMARY OF THE INVENTION

The invention comprises an article comprising: a retroreflective optical element; and a plasmonic material on the optical element.

The invention further comprises a method comprising: providing a substrate having thereon a plurality of articles comprising: a retroreflective optical element; and a plasmonic material on the optical element; performing an optical measurement on the substrate.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The disclosed method uses retroreflective optical elements which reflect light back towards the source, such as beads. The retroreflectors are plasmonic and can exhibit enhanced Raman scattering and fluorescence. The use of the retroreflector beads in SERS and SEF may produce optical enhancement beyond other existing SERS or SEF based chemical or biological sensors. The retroreflector beads are made SERS or SEF active by coating them with a plasmonic material. The plasmonic material may by a solid plasmonic metal or, for example, metal nanoparticles that include various geometries such as solid structures or metal coated dielectrics. The optical enhancement is produced by allowing multiple passes of the exciting light and by recovering forward scattered signal that is normally lost. Suitable plasmonic metals include, but are not limited to, silver, gold, nickel, platinum, and copper.

Commercially available retroreflector beads can be used to accomplish enhancements of the optical SERS or SEF signal. In this case, the retroreflector beads can act to improve the signal and do not require specialized substrates or precise coupling of light. In fact, by their nature they are efficient light reflectors. In addition, they can be used to effectively locate the SERS or SEFs sensors. Other suitable retroreflective optical elements include, but are not limited to, prismatic, non-spherical, cats eye, corner cube, and microelectronically-formed retroreflectors.

Figure 1:
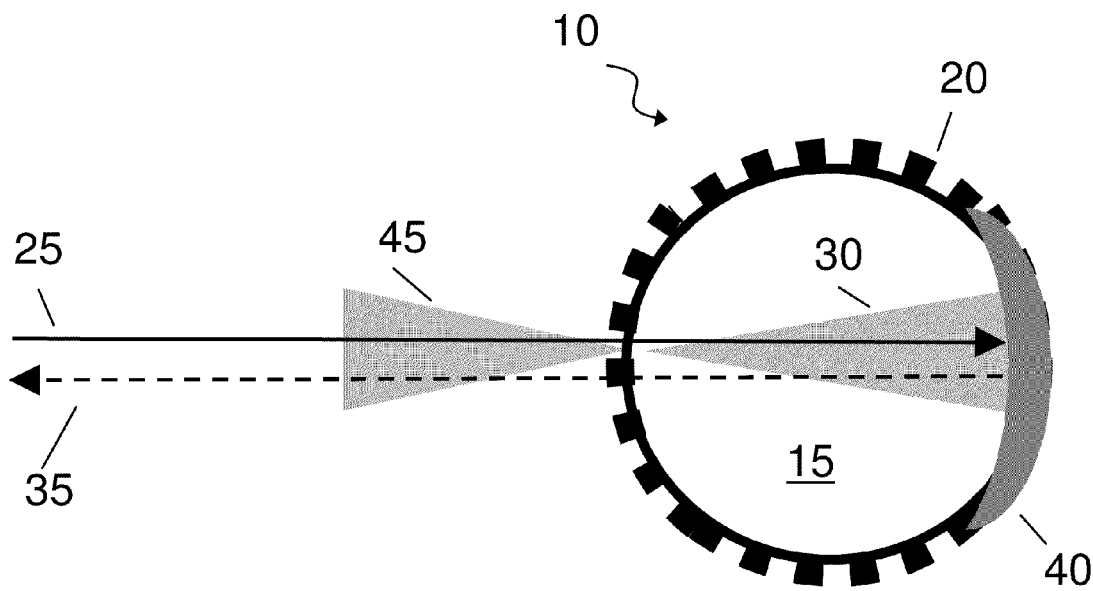
FIG. 1 shows the design and action of a SERS active retroreflector bead.

FIG. 1 shows the design and action of a SERS active retroreflector bead 10. The bead is composed of a transparent material 15 such as glass or any oxide like $Ba_2O_3$. High index glasses and ceramics (for example, n>1.5, 2, or 3) such as silica or barium titanate ($BaTiO_3$) may be used. Barium strontium titanate ($BaSrTiO_3$), a transparent glass, or a transparent ceramic may also be used. The diameter of the bead is not restricted and may range from about 1 micron to 10's of microns to mm's. The SERS active coating 20 is applied by any number of typical techniques: colloidal metal growth, Ag or Au coated nanoshells and the growth of dielectric nanowires directly onto the substrate and subsequently coated with a metal shell. The exciting laser 25 results in SERS scattered light 30 and is reflected 35 back toward the source at the rear of the bead, which may include an optional rear reflector 40. Suitable rear reflector materials include, but are not limited to, silver, aluminum, and a reflective dielectric, and may cover only one hemisphere or less of the bead. The reflected laser beam 35 produces a second pass at exciting surface enhanced Raman scattering from the SERS active front surface 45. The forward scattered Raman signal 30 is also recovered by the bead.

Once the coating is applied the bead can be used in an array of beads to form a new highly sensitive SERS substrate to replace flat SERS substrates in applications such as medical sensors systems. Any method of attaching the beads to the substrate that does not block the light may be used, including but not limited to, epoxy glue. Alternately, the beads and an adhesive may be propelled toward the substrate to attach them. In addition, the SERS beads can be used individually for remote SERS applications or as components of road signs or lines drawn on roads and then probed remotely. The substrate may also be any horizontal surface, such as ground or pavement, on which the retroreflectors are scattered or placed. If retroreflectors are present on the beads, they may or may not be uniformly oriented towards the substrate.

The substrate may have a single bead or multiple beads that may be arranged in an array or a microarray. The beads may all be the same or there may be different beads for different analyte, agent, or species detection. The array allows the different types of beads to be probed separately by the laser or other light source being directed at subsets of the beads or individual beads.

Figure 2:
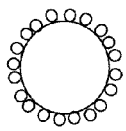
FIG. 2 shows three different configurations for SERS active retroreflectors.
Figure 2:
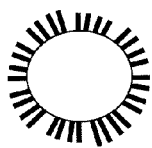
Figure 2:
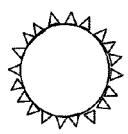

FIG. 2 shows a schematic diagram of retroreflector beads coated with Ag nanoshells (2a) and Ag dielectric core nanowires (2b) and just a simple thin Ag coating (2c). The nanoshells may be, for example, silver, gold, or nickel coated on silica or polystyrene nanospheres. Alternatively, for example, silver, gold, copper, or nickel nanoparticles may be used for the nanoshells. In the case of the nanowires, the orientation of the wires can be parallel or perpendicular to the radius of the bead. The nanowires or other nanostructures may be, for example, silver, gold, copper, nickel, or nanowires or nanostructures such as ZnO or $Ga_2O_3$ coated with these metals. While the method of application of the coating will vary whether the coating is nanoshells or nanowire based, the thickness of the Ag shells is a factor. Because the optical activity of the retroreflector beads may be maintained, the SERS coating may be such that the light is not fully adsorbed into the coating. Thus coatings of Au or Ag can be restricted to less than 10 nm thick in order to maintain the optical activity of the retroreflector bead, Nanowires may be made by known methods such as FON (film on nanoshell), VLS (vapor-liquid-solid), and hydrothermal fabrication.

Aligned Ag nanowires may produce large enhancements along the lengths of wires. This may explain the ability of the retroreflectors to guide light to the core and to expand the SERS sensitive area. This may enable more directed SERS scattering by producing narrow channels that guide SERS away from substrate. Aligned nanowires on a retroreflector bead can enhance the SERS by producing multiple reflections of the exciting laser. The guides the SERS scattering by making it directional along the nanowires. The net effect may be to significantly increase SERS collection efficiency.

The retroreflector surfaces may have a surface roughness between, for example, 10 and 300 nm. Thus the surface topography offers a template for the direct fabrication of a SERS/SEF active surface by coating the retroreflector bead with a suitable plasmonic metal such as silver, gold, or nickel. The coating provides a hemispherical feature. This approach is schematically depicted in FIG. 2c.

A number of optical measurements may be performed on the substrate. Methods of Raman scattering, fluorescence, infrared spectroscopy, and optical reflectivity are known in the art. Such measurements may be performed after exposing the substrate to the environment or to a sample suspected of containing a Raman-or fluorescent-active compound.

The measurement may also be performed with an exciting laser or collimated light source projected onto the substrate from a device that is not physically coupled to the substrate. For example, the substrate may be mounted at a monitoring location and the laser may be at a remote location or in a portable device for interrogating the substrate. The laser may be, for example, at least about 2 m or 50 m from the substrate and may be any distance away, including miles away, if the scattered or fluorescent light may be detected. This can allow for standoff detection of materials such as explosives and chem-bio agents and tagging and tracking the motion of vehicles and individuals.

Prior plasmonic substrates generally use flat materials such as glass, metals, and semiconductors that have a nanoscale metallic pattern formed on them, either by lithography, deposition of metallized nanoparticles or direct growth of nanoparticles on the substrate. Substrates for increasing the plasmonic excitation or collection of light involve totally attenuated reflection configurations or whispering gallery (Cai et al., *Opt. Lett.*, 25, 260-262 (2000)) mode excitation using silica microspheres. In both cases, the optical configuration requires very specific coupling of light into the substrate or microsphere.

The presently described substrates may have a number or potential advantages over prior substrates. Bead size may not be an issue. Any size may be suitable. No special substrate is required for the application of the beads. The surface roughness of retroreflector beads may be about 50 nm. Thus a 5 nm coating with a plasmonic metal such as Au or Ag can make the bead SERS or SEF active. The bead can be made even more sensitive with standard techniques that are employed in making flat substrates plasmonic. The excitation of SERS or SEFs does not require specialized optical equipment and can be achieved with a simple laser and CCD based spectrograph. Plasmonic retroreflector beads can be deployed for remote sensing applications, such as chem-bio detection and tagging and tracking. The optical property of the bead in efficiently returning probe light can allow for rapid bead location. The plasmonic beads can be used in signs and roadside markings as sensors. The plasmonic beads can be used in medical applications for surface plasmon resonance, SEFs and SERS based trace detection in ordered assays. The use of specific numbers of beads in this case an improve detection statistics, by sampling individual beads in an assay.

Having described the invention, the following examples are given to illustrate specific applications of the invention. These specific examples are not intended to limit the scope of the invention described in this application.

EXAMPLES

Retroreflector beads were coated with Ag nanoshells and dielectric core nanowires with Ag coatings of 6 nm and just Ag coatings without any additional nanoparticles. The procedures used in the coating are similar to what would be used for flat substrates. In the case of the nanoshells, 6 nm of Ag was coated on silica beads of 50 nm and 500 nm diameters. In the case of the nanowire (NW) coatings, ZnO nanowires and $Ga_2O_3$ NWs were directly grown onto the retroreflector beads and subsequently coated with Ag. While these were the coatings that we used, it is possible to use solution based or high pressure growth of Ag or Au nanowires. In addition, it is possible to use solid metal nanostructures, provided that they are isolated or nearly touching but leave enough access of the light to the bead surface so that the laser light can pass by the nanoparticles and into the retroreflector bead.

Figure 3:
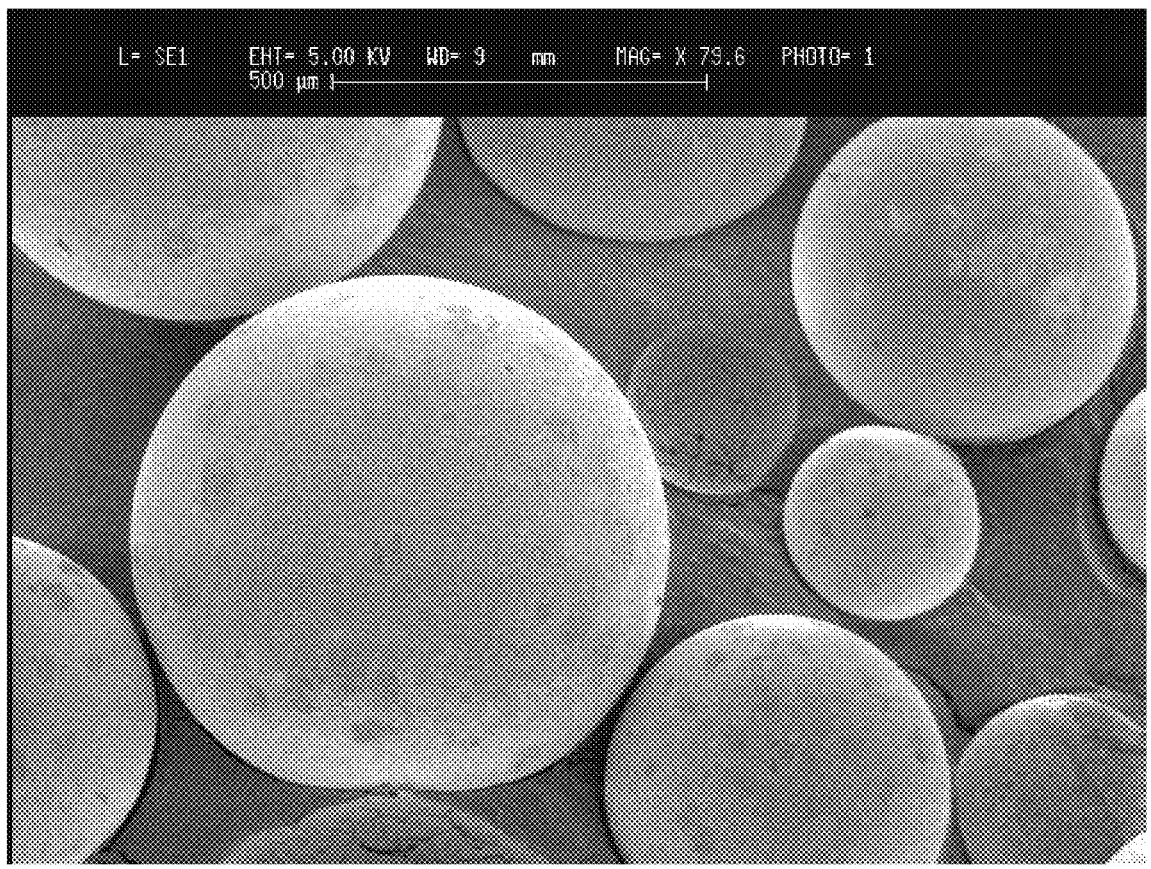
FIG. 3 shows an SEM picture of SERS active retroreflector beads.
Figure 4:
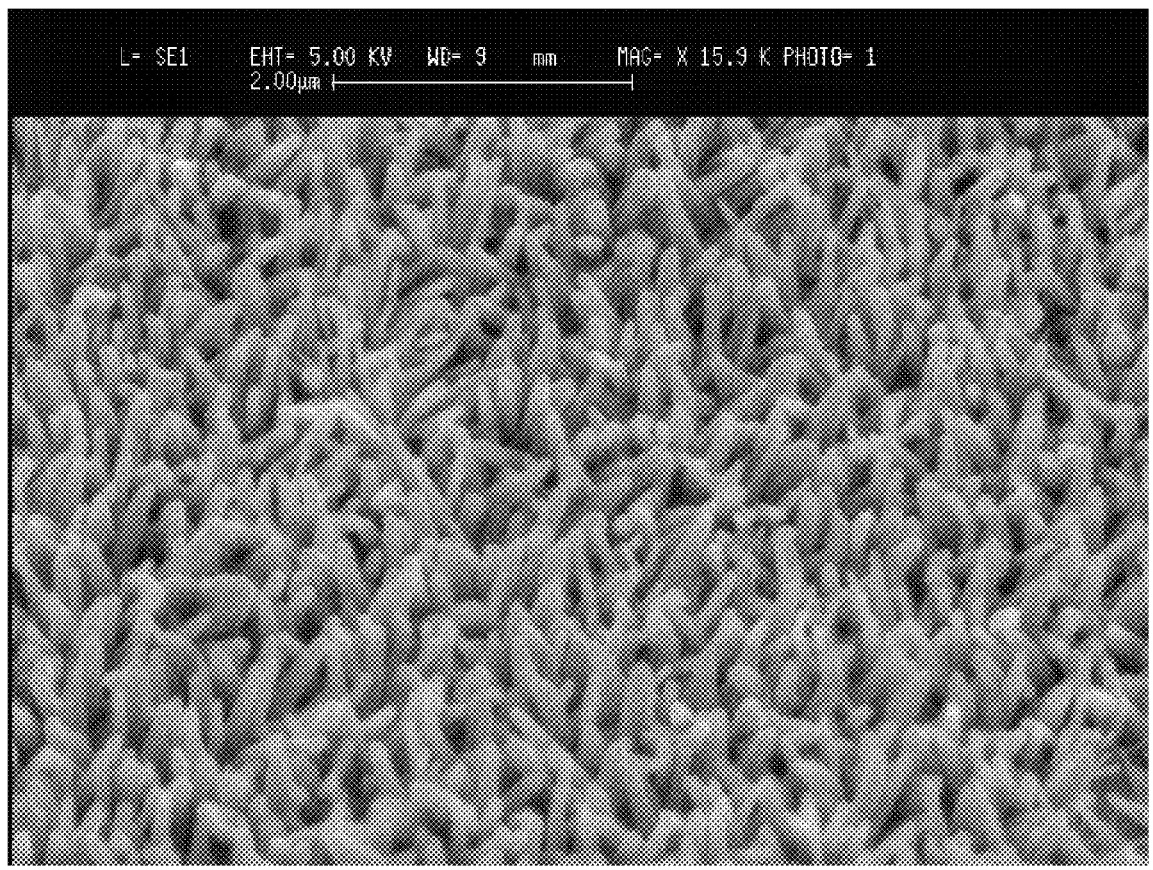
FIG. 4 shows an SEM picture of a 3D array of $Ga_2O_3$ nanowire cores with 6 nm Ag metal shell coating on retroreflector beads.

FIG. 3 shows an SEM picture of several retroreflectors that were covered with Ag/ZnO dielectric-core nanowires, grown perpendicular to the bead surface. Since the retroreflectors were commercial $BaTiO_3$ beads, their sizes varied significantly as is seen in FIG. 3, from 100 µm to 500 µm. The nanowire surface structure is shown in FIG. 4. The micrograph shows a dense distribution of nanowires with diameters of 100 nm or less. In this case, the lengths of the wires were small enough (1-2 µm) so that they were oriented perpendicular to the surface of the retroreflector. Growing the wires long enough would cause them to collapse and form a network of crossed wires laying flat on the retroreflector surface. Both types of coatings on flat Si surfaces and have demonstrated to have plasmonic activity.

Figure 5:
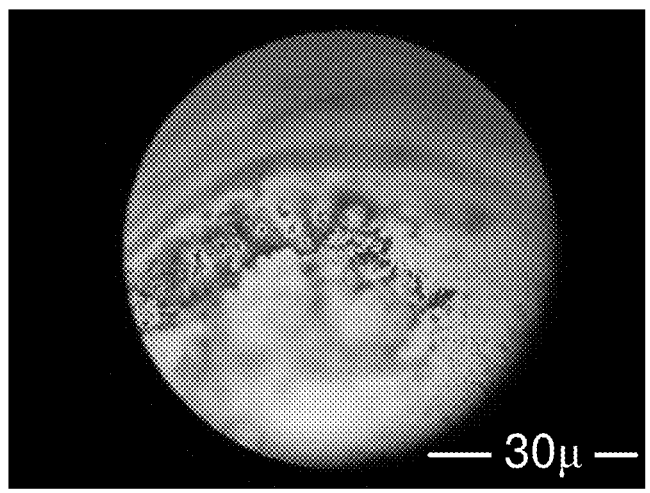
FIG. 5 shows a micrograph of the surface of a 270 μm diameter retroreflector bead coated with 500 nm diameter Ag shells that have a silica core. The Ag shells are seen as the fine structure in the image.
Figure 5:
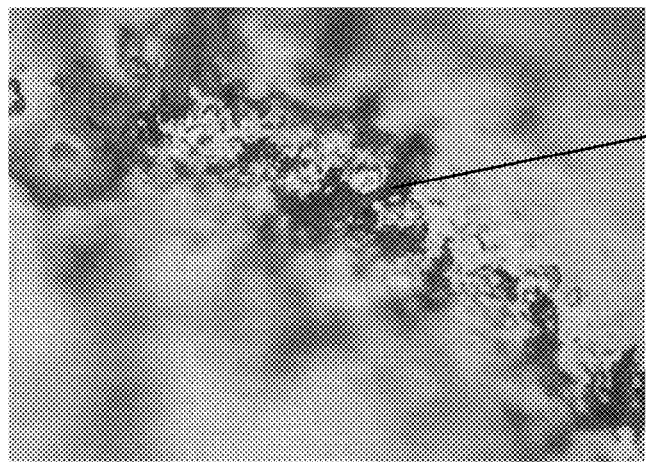

FIG. 5 shows a high resolution (500×) micrograph of the surface of a 270 µm retroreflector bead that was coated with 500 nm diameter Ag shells that had a silica core and a shell thickness of 5 nm. The distribution of shells is random, but their presence is clearly indicated by the presence of the small dotted structure.

Figure 6:
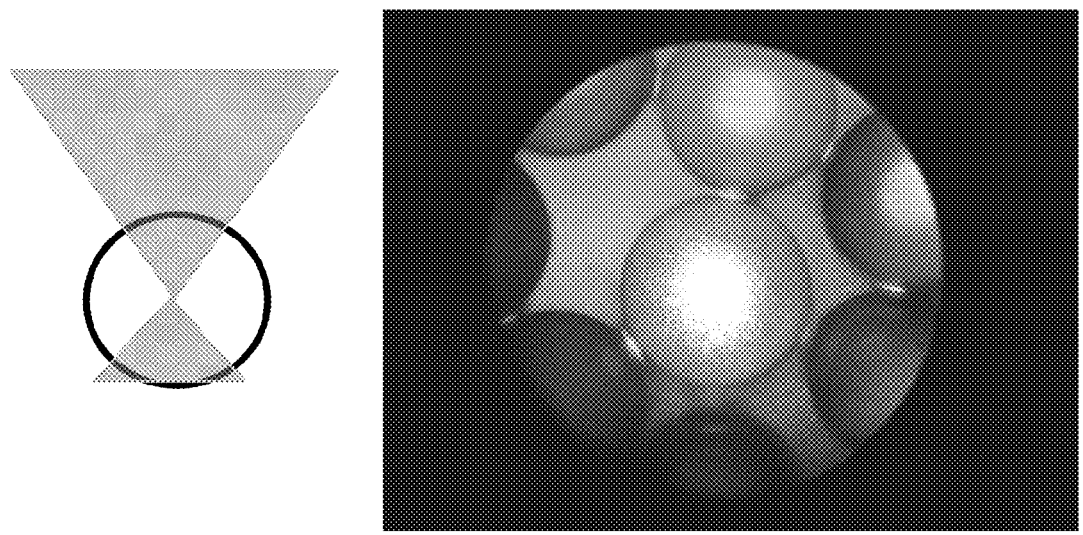
FIG. 6 shows an exciting laser focused at the center of a bead.
Figure 7:
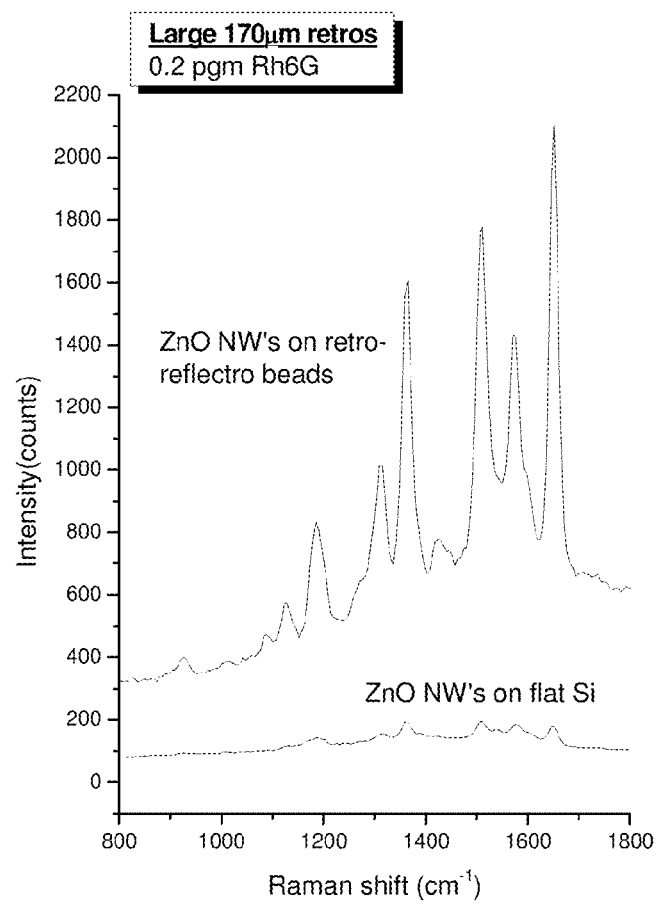
FIG. 7 shows an SER spectra for 0.2 pg of Rhodamine 6G (Rh6G), showing the enhanced signal in comparison to a simple flat substrate.
Figure 8:
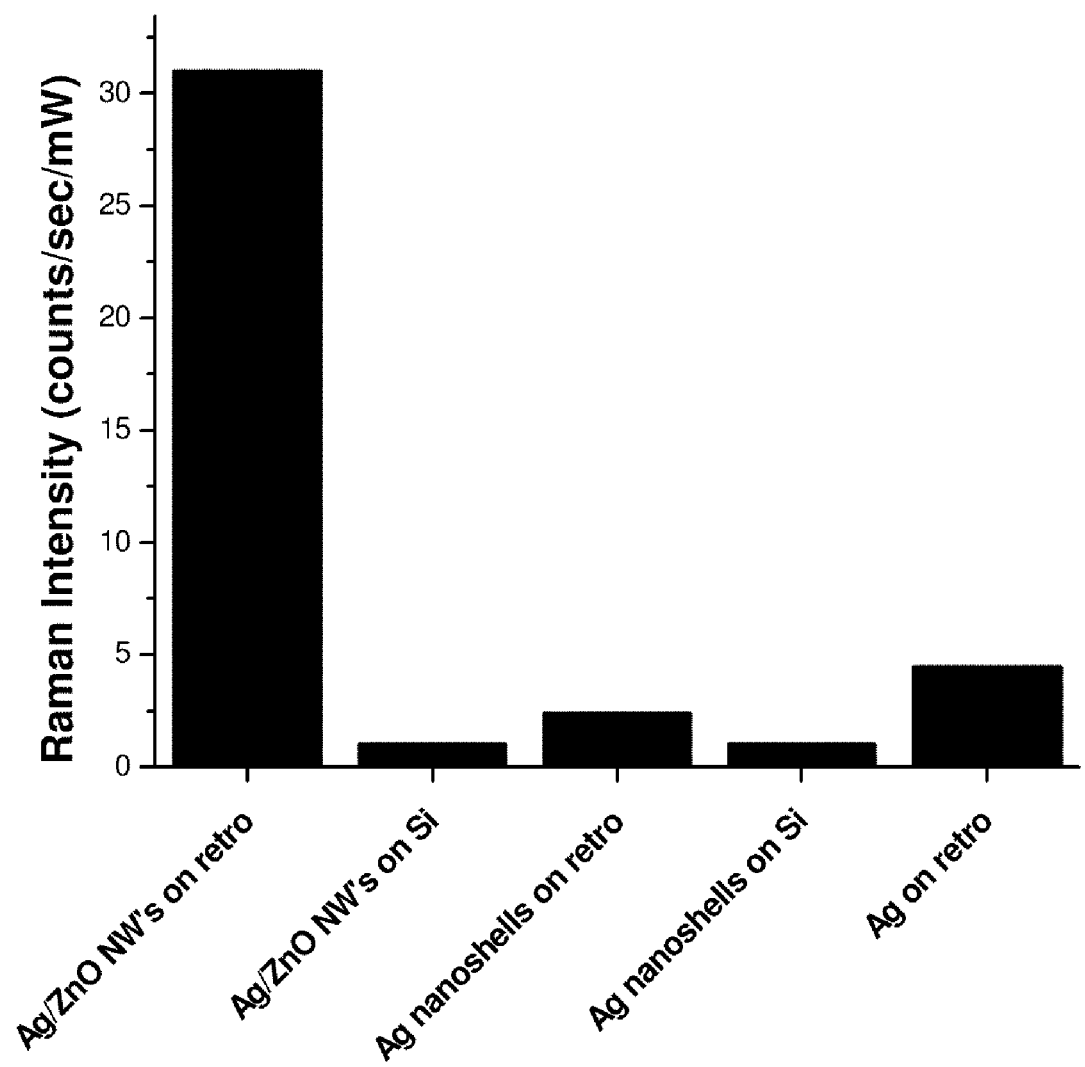
FIG. 8 shows SERS data for 0.2 pg of Rhodamine 6G, showing the enhanced signal in comparison to a simple flat substrate.

The SERS/SEFS sensitivity of the retroreflector beads was obtained by using a micro-Raman system and a Rhodamine 6G solution of various molarities. The laser spot size was about 60 µm. In this approach, the SERS activity of single bead was compared to a comparable SERS coated flat Si substrate. FIG. 6 shows a diagram of how a single bead was illuminated and a picture of such a bead. The light was focused at a point that was at the center of the bead. This was verified by observing the sharp focus of the outer edges of the bead, as seen in FIG. 6. This approach guaranteed the proper use of the bead. FIG. 7 shows the Raman spectra for $10^{-6}$ M of Rhodamine dissolved in methanol and obtained in the manner indicated in FIG. 6. The spectra clearly show a significant increase in the Raman signal for Rh6G applied to a bead coated with Ag/ZnO nanowires, compared to a flat Si substrate coated with the same density of Ag/ZnO NW's. The signal enhancement from using the bead is a factor of 30. The comparison of the SERS activity of the bead compared to a flat Si substrate is shown in FIG. 8 showing the normalized SERS intensity for Rh6G for flat Si substrates, Ag/ZnO NW and Ag nanoshells. The normalization is to the flat Si substrate with the corresponding nanostructure.

In addition, FIG. 8 shows the SERS signal for Rh6G from a 5 nm Ag coating on the retroreflector bead, normalized to the NW on Si SERS signal. Even a simple 5 nm Ag coating works because the average surface roughness of the bead as measured by AFM is 50 nm. This size roughness is the correct dimension for plasmonic effects, when coated by a metal such as Ag or Au.

In each case, the retroreflector bead acted to increase the SERS signal by acting as a more efficient light gathering element compared to a flat substrate. While Rhodamine 6G was used here, any other chemical species may also work.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. An article comprising:
a retroreflective optical element; and
a plasmonic material on the surface of the optical element.

2. The article of claim 1, wherein the optical element is a retroreflective bead.

3. The article of claim 2, wherein the bead is at least about 1 micron in diameter.

4. The article of claim 2, wherein the bead comprises silica, barium titanate, barium strontium titanate, a transparent glass, or a transparent ceramic.

5. The article of claim 2, wherein the bead comprises a rear reflector.

6. The article of claim 1, wherein the plasmonic material comprises a plurality of silver, gold, copper, or nickel nanoparticles or nanostructures on the optical element.

7. The article of claim 6, wherein the nano structures are nanowires.

8. The article of claim 1, wherein the plasmonic material comprises silver-, gold-, copper-, or nickel-coated dielectric nanostructures on the optical element.

9. The article of claim 8, wherein the nanostructures are nanowires.

10. The article of claim 8, wherein the nano structures are silica or polystyrene nanospheres.

11. The article of claim 1, wherein the plasmonic material comprises a silver, gold, copper, or nickel coating on the optical element.

12. A device comprising:
a substrate; and
a one or more of the articles of claim 1 on the substrate.

13. The device of claim 12;
wherein the one or more articles includes at least two types of articles that bind different analytes; and
wherein the articles are arranged in an array or a microarray.

14. A method comprising:
   providing a substrate having thereon one or more articles comprising:
      a retroreflective optical element; and
      a plasmonic material on the surface of the optical element;
   performing an optical measurement on the substrate.

15. The method of claim 14, wherein the optical measurement is Raman scattering or fluorescence.

16. The method of claim 14, wherein the optical measurement is infrared spectroscopy or optical reflectivity.

17. The method of claim 14, further comprising:
   exposing the substrate to a sample suspecting of containing a Raman- or fluorescent-active compound before performing the measurement.

18. The method of claim 14, further comprising:
   exposing the substrate to the environment before performing the measurement.

19. The method of claim 14, wherein the optical measurement is performed with an exciting laser or collimated light source projected onto the substrate from a device that is not physically coupled to the substrate.

20. The method of claim 19, wherein the exciting laser or collimated light source and the substrate are separated by at least 2 meters.

21. The method of claim 14, wherein the optical element is a silica, barium titanate, barium strontium titanate, transparent glass, or transparent ceramic retroreflective bead at least about 1 micron in diameter.

22. The method of claim 21, wherein the bead comprises a rear reflector.

23. The method of claim 14, wherein the plasmonic material comprises:
   a plurality of silver, gold, copper or nickel nanoparticles, nanowires, or nanostructures on the optical element;
   silver-, gold-, copper-, or nickel-coated dielectric nanostructures or nanowires on the optical element; or
   a silver, gold, copper, or nickel coating on the optical element.

24. The method of claim 14;
   wherein the one or more articles includes at least two types of articles that bind different analytes;
   wherein the articles are arranged in an array or a microarray; and
   wherein the optical measurement is performed separately on each of the types of articles.

* * * * *